United States Patent
Bedi et al.

(10) Patent No.: US 10,152,213 B2
(45) Date of Patent: Dec. 11, 2018

(54) TECHNIQUES FOR SELECTING OBJECTS IN IMAGES

(71) Applicant: Adobe Systems Incorporated, San Jose, CA (US)

(72) Inventors: Ajay Bedi, Himachal Pardesh (IN); Sourabh Gupta, Uttar Pradesh (IN)

(73) Assignee: Adobe Systems Incorporated, San Jose, CA (US)

( * ) Notice: Subject to any disclaimer, the term of this patent is extended or adjusted under 35 U.S.C. 154(b) by 389 days.

(21) Appl. No.: 15/254,163

(22) Filed: Sep. 1, 2016

(65) Prior Publication Data

US 2018/0061052 A1 Mar. 1, 2018

(51) Int. Cl.
| | |
|---|---|
| G06F 3/0484 | (2013.01) |
| G06T 7/62 | (2017.01) |
| G06T 7/73 | (2017.01) |
| G06T 7/11 | (2017.01) |
| G06T 7/13 | (2017.01) |
| G06K 9/46 | (2006.01) |
| G06F 3/0488 | (2013.01) |

(Continued)

(52) U.S. Cl.
CPC ........ *G06F 3/04842* (2013.01); *G06F 3/0488* (2013.01); *G06F 3/04845* (2013.01); *G06K 9/4671* (2013.01); *G06K 9/6211* (2013.01); *G06K 9/6253* (2013.01); *G06T 7/11* (2017.01); *G06T 7/12* (2017.01); *G06T 7/13* (2017.01); *G06T 7/62* (2017.01); *G06T 7/73* (2017.01); *G06T 11/00* (2013.01); *G06F 3/04883* (2013.01); *G06T 2200/24* (2013.01); *G06T 2207/20012* (2013.01); *G06T 2207/20021* (2013.01); *G06T 2207/20104* (2013.01)

(58) Field of Classification Search
None
See application file for complete search history.

(56) References Cited

U.S. PATENT DOCUMENTS

| | | | |
|---|---|---|---|
| 2003/0095710 A1* | 5/2003 | Tessadro | G06T 7/12 382/199 |
| 2005/0228614 A1* | 10/2005 | Usbeck | G01B 21/045 702/179 |

(Continued)

OTHER PUBLICATIONS

Endres, Ian, and Derek Hoiem. "Category independent object proposals." Computer Vision-ECCV 2010 (2010): 575-588. 15 pages.*

(Continued)

*Primary Examiner* — Ryan P Potts
(74) *Attorney, Agent, or Firm* — Kilpatrick Townsend & Stockton LLP

(57) ABSTRACT

Various embodiments include automatically selecting and modifying objects within an image that are similar to an object previously selected by a user. A user first selects an object in a displayed image. Object feature descriptors are generated describing a shape formed by edges of the object, and image feature descriptors are generated describing shapes formed by edges automatically detected in the image. The object feature descriptors are compared with the image feature descriptors to automatically identify other objects in the image having edges similar to the selected object. The pixels of the user selected object and the automatically identified objects are modified according to a user specified function.

20 Claims, 8 Drawing Sheets

(51) Int. Cl.
  *G06K 9/62* (2006.01)
  *G06T 11/00* (2006.01)
  *G06T 7/12* (2017.01)

(56) References Cited

U.S. PATENT DOCUMENTS

| | | | | |
|---|---|---|---|---|
| 2008/0204569 A1* | 8/2008 | Miller | ............... | G06F 17/3079 |
| | | | | 348/222.1 |
| 2008/0304735 A1* | 12/2008 | Yang et al. | ............ | G06K 9/621 |
| | | | | 382/164 |
| 2010/0040285 A1* | 2/2010 | Csurka | ............... | G06K 9/00624 |
| | | | | 382/170 |
| 2015/0036938 A1* | 2/2015 | Kim | ............... | G06T 7/0044 |
| | | | | 382/201 |
| 2015/0371101 A1* | 12/2015 | Yamamoto | ............ | G06T 11/60 |
| | | | | 715/771 |

OTHER PUBLICATIONS

Hoiem, Derek, Alexei A. Efros, and Martial Hebert. "Recovering occlusion boundaries from an image." International Journal of Computer Vision 91.3 (2011): 328-346. 19 pages.*

Rublee, Ethan, et al. "ORB: An efficient alternative to Sift or Surf." Computer Vision (ICCV), 2011 IEEE international conference on. IEEE, 2011. 10 pages.*

* cited by examiner

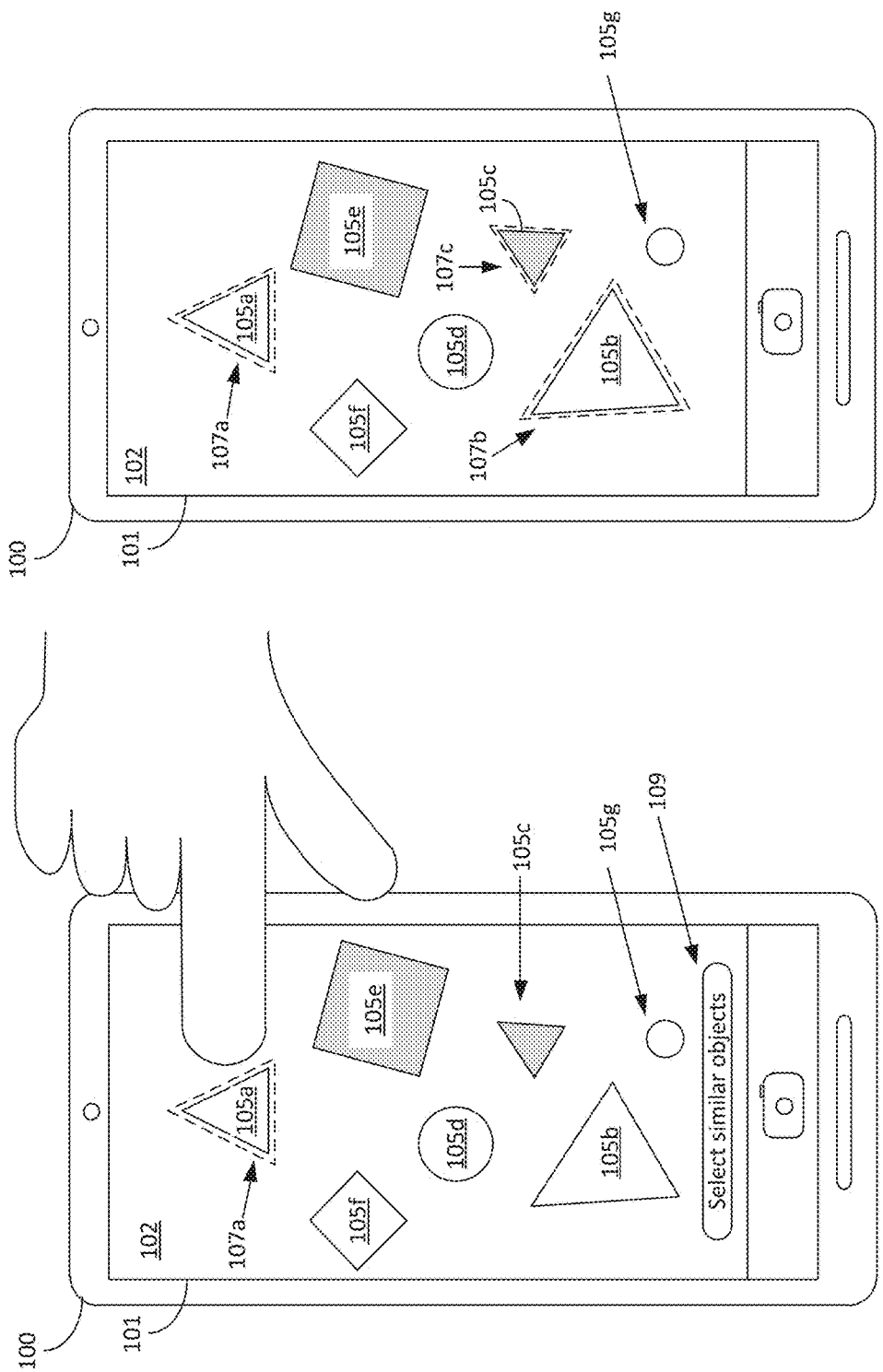

TECHNIQUES FOR SELECTING OBJECTS IN IMAGES

BACKGROUND

In an image editing application, selecting a portion of an image to be edited is a fundamental operation. For example, if a user wants to edit a particular object in an image, the user needs to draw a selection around that object. A complex object may require a significant amount of time to properly draw the selection and this time is multiplied when there are multiple similar objects to be selected. What is needed is a way to identify an object that the user has selected and provide the ability to automatically select other similar objects within the image.

SUMMARY

Various aspects of the present invention relate to a computing device automatically selecting similar objects for modification within one or more images. To this end, the computing device receives input via an input device that specifies a first selection of a first object in an image displayed on a user interface of the computing device. The computing device generates a first set of feature descriptors that describe a shape formed by edges of the first object.

Other edges in the image are identified and a second set of feature descriptors is generated describing shapes formed by the other edges. In some implementations, the other edges are from the remaining portion of the image that excludes the first object. The computing device determines one or more edge objects in the image that are similar in shape to the first object by identifying each grouping of the other edges that has feature descriptors of the second set of feature descriptors that describe a shape that is within a similarity threshold to the shape described by the first set of feature descriptors. Pixels in the image of the first object and each similar edge object of the image are modified by the computing device based on a function specified by a user.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 1-2 are diagrams of an example user interface rendered by a computing device according to various embodiments of the present disclosure.

DETAILED DESCRIPTION

Figure 3:
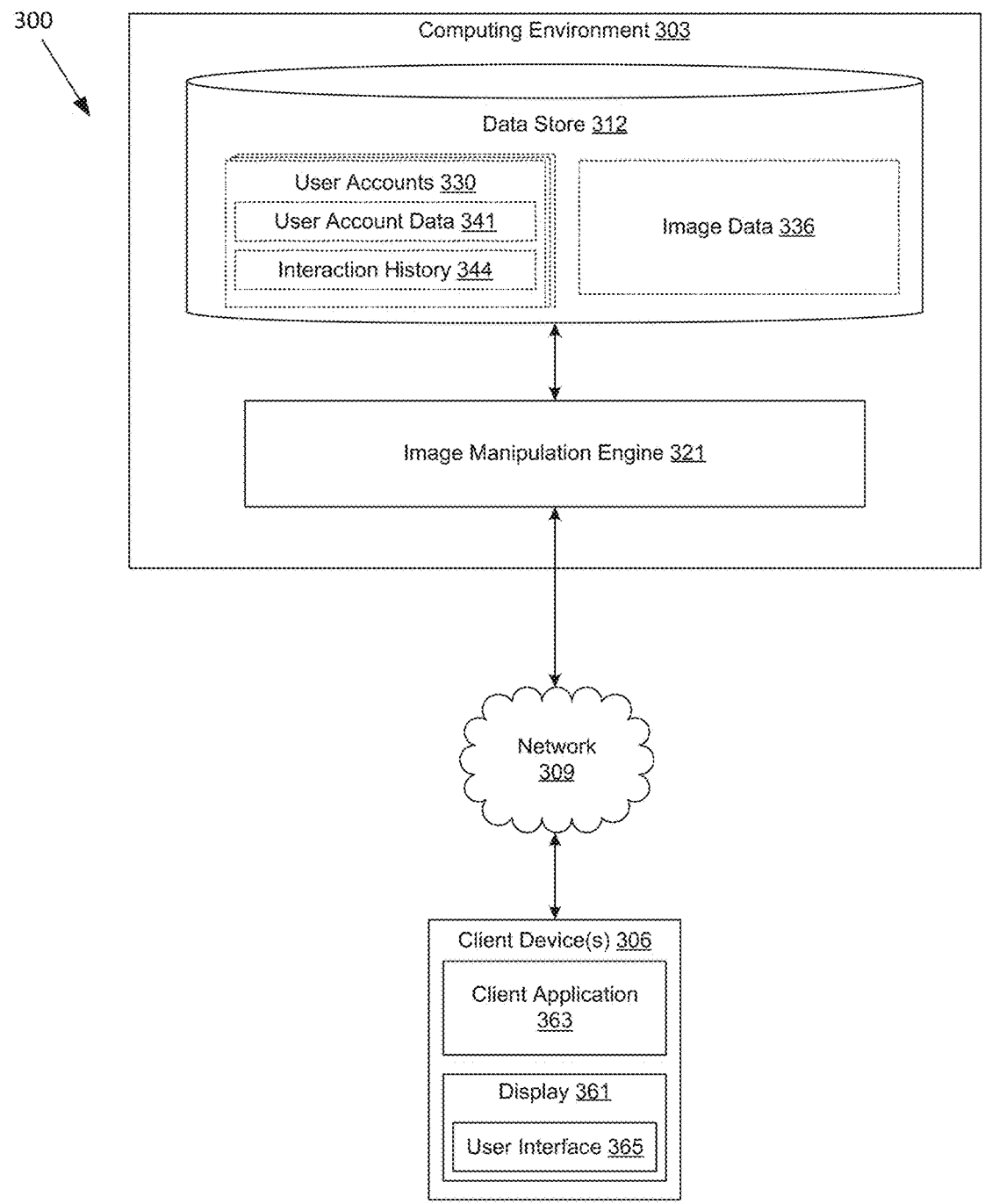
FIG. 3 is a diagram of a networked environment according to various embodiments of the present disclosure.

Disclosed herein are various embodiments of a system and method for automatically selecting and manipulating objects within an image that are similar to an object previously selected by a user, using feature descriptors that describe the shape formed by edges detected in the previously selected object and the shapes formed by edges detected in the remaining portion of the image. Feature descriptors generated for the previously selected object are compared with the feature descriptors generated for the remaining portion of the image to identify other objects in the image having edges similar to the previously selected object. The pixels of the user-selected object and the automatically selected objects may then be modified according to a user specified function (e.g., a function to change color, pattern, brightness, contrast, etc., or to delete or otherwise modify all of the selected objects).

The illustrations of FIGS. 1 and 2 provide an example use case for the techniques disclosed herein, while the remaining figures provide a more detailed description of the techniques. As shown in the illustration of FIG. 1, a mobile device 100 executing an image editing application uses a touch-sensitive display 101 to present an image 102 that includes various objects 105*a-g*. Using the touch-sensitive display 101 and/or other possible input devices, a user can draw a selection around one or more objects 105*a-g*, such as the selection 107*a* made around the object 105*a*.

Once a selection 107*a* is made, the user can direct the mobile device 100 to automatically select other objects in the image 102 and/or within other images (not shown) that are similarly shaped to the previously selected object 105*a* by tapping the button 109 in the user interface or by other possible input. Subsequently, the mobile device 100 evaluates the shapes of the various other objects 105*b-g* in the image 102 to determine if any are similarly shaped to the selected object 105*a*. The evaluation is performed based on the shapes formed by the edges of the objects 105, whereby an object may be determined "similar" to another object without regard to its scaling (i.e., size), orientation, color, or texture.

Thus, since the shape formed by the edges of the selected object 105*a* is a triangle in this example, the mobile device 100 identifies other objects with triangular shaped edges, such as the object 105*b*—despite it being a different size and orientation—and the object 105*c*—despite it being a different color, size, and orientation. Then, as shown in FIG. 2, the mobile device 100 makes a selection of the perimeter of each of the similar objects, such as the selection 107*b* for the object 105*b* and the selection 107*c* for the object 105*c*. Following the automatic selection of the similar objects 105*b-c*, the user interface of the mobile device 100 may provide the user with controls (not shown) to de-select and/or adjust one or more of the selections 107 made.

When satisfied with the selections 107, the user can provide input to the mobile device 100 for selecting a function of the image editing application to modify the pixels of the selected objects 105*a-c*. For example, the user may choose to apply a filter that changes the color, pattern, etc. of the objects 105*a-c*, or the user may choose to remove the objects 105*a-c* from the image 102. Thereafter, the image 102 and any modifications made to it are stored by the mobile device 100 as a modified image file. Among other improvements from automatic selection of similar objects, a single instance of an image editing application allows a user to save a substantial amount of time from the lengthy and error-prone process of manually selecting each similar object that may be present in one or more images. This provides not only improved usability and convenience for the user, but also can reduce consumption of computing resources, such as memory space, processor usage and/or network bandwidth. In the following discussion, a general description of the system and its components is provided, followed by a discussion of the operation of the same.

As used herein, the phrase "invariant to uniform scaling" refers to the characteristic of being independent from the size of an object. For example, describing the shape of an object in an image with feature descriptors that are invariant to uniform scaling means that the shape of the object is described in a manner that is independent of the size of the object. Thus, if the size of this object is uniformly increased or decreased, the feature descriptors for the object will be the same.

As used herein, the phrase "invariant to orientation" refers to the characteristic of being independent from the orientation or rotation of an object. For example, describing the shape of an object in an image with feature descriptors that are invariant to orientation means that the shape of the object is described in a manner that is independent of the way in which an object is rotated in the image. Thus, if the object is rotated in the image (e.g., 180 degrees), the feature descriptors for the object will be the same.

With reference to FIG. 3, shown is a networked environment 300 according to various embodiments. The networked environment 300 includes a computing environment 303 and a client device 306, which are in data communication with each other via a network 309. The network 309 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks. Although the functionality described herein is shown in the context of the networked environment 300, other implementations are possible, such as implementing the functionality in a single computing device (e.g., desktop computer or mobile device), as a plug-in or auxiliary feature of another service executed in a computing device, and/or in arrangements of computing devices other than those shown in FIG. 3.

The computing environment 303 may comprise, for example, a server computer or any other system providing computing capability. Alternatively, the computing environment 303 may employ a plurality of computing devices that may be arranged, for example, in one or more server banks or computer banks or other arrangements. Such computing devices may be located in a single installation or may be distributed among many different geographical locations. For example, the computing environment 303 may include a plurality of computing devices that together may comprise a hosted computing resource, a grid computing resource and/or any other distributed computing arrangement. In some cases, the computing environment 303 may correspond to an elastic computing resource where the allotted capacity of processing, network, storage, or other computing-related resources may vary over time.

Various applications and/or other functionality may be executed in the computing environment 303 according to various embodiments. Also, various data is stored in a data store 312 that is accessible to the computing environment 303. The data store 312 may be representative of a plurality of data stores 312 as can be appreciated. The data stored in the data store 312, for example, is associated with the operation of the various applications and/or functional entities described below.

The components executed on the computing environment 303, for example, include an image manipulation engine 321, and other applications, services, processes, systems, engines, or functionality not discussed in detail herein. As discussed in detail herein, the image manipulation engine 321 is executed to facilitate image editing, including detecting and manipulating objects in one or more images that are similar to an object in an image selected by a user.

The data stored in the data store 312 includes, for example, user accounts 330, image data 336, and potentially other data. The image data 336 includes data and metadata that may be stored for various images in different possible formats, such as Joint Photographic Expert Group (JPEG), Portable Network Graphics (PNG), Graphics Interchange Format (GIF), and/or other possible image formats as can be appreciated. The metadata can include size of the image, pixel coordinates of objects and/or selections made, resolution, geographic location ("geolocation"), camera settings used to capture the image, and/or other possible information. The image data 336 can also include various attributes and permissions related to user accounts 330 for creating, accessing, modifying, and/or deleting images. In addition, the image data 336 can include storing one or more versions of an image, such as one version stored before a modification, and a second version of the image stored after the modification. In some implementations, the images stored in the data store 312 may be stored as files.

The individual user accounts 330 may include user account data 341, interaction history 344, and other possible data. The user account data 341 can include user identifiers, user group identifiers, credentials, permissions, associated client devices 306, etc. The interaction history 344 includes a log of the various images modified by a user, identifiers and/or metadata for objects in the images selected and/or identified, whether an automatically selected object was de-selected or the selection adjusted by the user, and possibly other information.

The client 306 is representative of various possible client devices that may be coupled to the network 309. The client 306 may comprise, for example, a processor-based system such as a computer system. Such a computer system may be embodied in the form of a tablet computer, a smartphone, a desktop computer, a laptop computer, a cellular telephone, a set-top box, or other devices with like capability. The client 306 may include connectivity to a display 361. The display 361 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. In some implementations, the display 361 is touch-sensitive.

The client 306 may be configured to execute various applications such as a client application 363 and/or other applications. The client application 363 may be executed in the client 306, for example, to access network content served up by the computing environment 303 and/or other servers, thereby rendering a user interface 365, such as a Graphical User Interface (GUI), on the display 361. To this end, the client application 363 may comprise, for example, a browser, a dedicated application, etc., and the user interface 365 may comprise a network page, an application screen, etc. The client 306 may be configured to execute applications beyond the client application 363 such as, for example, email applications, social networking applications, word processors, spreadsheets, and/or other applications.

Next, a general description of the operation of the various components of the networked environment 300 is provided. To begin, a user operating the client 306 employs the client application 363 to establish a communication session with the image manipulation engine 321. The communication session may be carried out using various protocols such as, for example, HyperText Transfer Protocol (HTTP), Simple Object Access Protocol (SOAP), REpresentational State Transfer (REST), User Datagram Protocol (UDP), Transmission Control Protocol (TCP), and/or other protocols for communicating data over the network 309. In some implementations, the user is authenticated to the image manipulation engine 321 using one or more user credentials.

Figure 4:
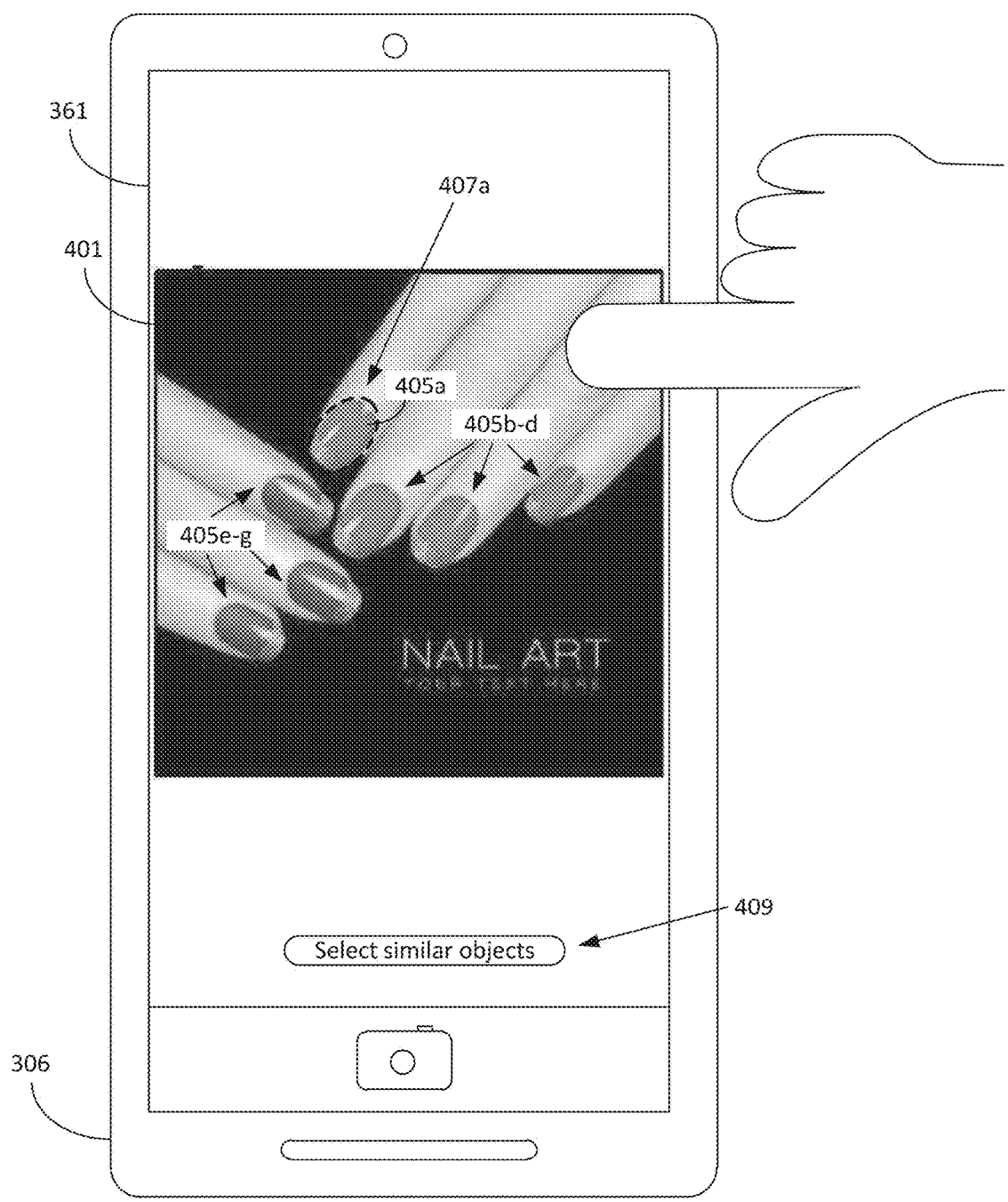
FIG. 4 is a diagram of another example user interface rendered by a computing device according to various embodiments of the present disclosure.

Thereafter, the user selects, from the user interface 365, an image to be edited, such as by selecting objects within the image to be modified. As illustrated in the example of FIG. 4, the image 401 may be presented on the touch-sensitive display 361 of a client device 306 or other computing device. Among the various objects in the displayed content of the image 401 are the objects 405a-g representing fingernails. Using the touch-sensitive display 361, a user can draw a selection around one or more of the objects 405a-g, such as the selection 407a made around the object 405a. It should be noted that although the input selecting the selection 407a is made with the touch-sensitive display 361 in the illustration of FIG. 4, other input devices may be used to make a selection instead of or in addition to a touch-sensitive display, such as a mouse, trackpad, keyboard, etc.

Figure 5:
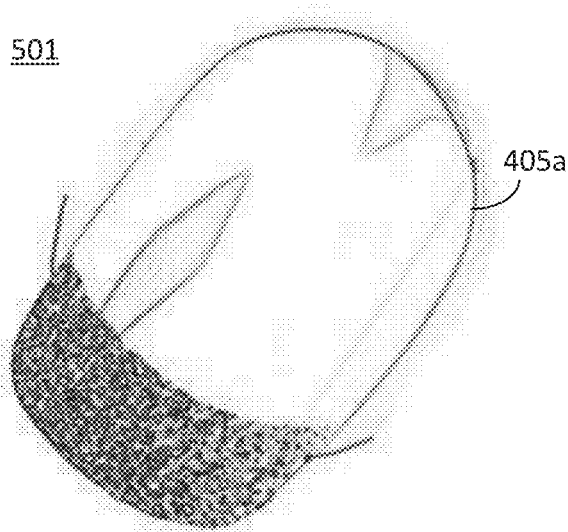
FIGS. 5-7 are exemplary diagrams of intermediate images that may be created by a computing device according to various embodiments of the present disclosure.

Once a selection 407a is made, the user can direct the client device 306 to automatically select objects in the image 401 that are similarly shaped to the previously selected object 405a by tapping the button 409 in the display 361 or by providing other possible input. In some implementations, the user can specify, via the user interface 365, that additional images accessible by the computing environment 303 and/or client device 306 should also be examined as part of the procedure to identify and select objects similar to the selected object 405a. Subsequently, the image manipulation engine 321 begins evaluating the shape of the object 405a as a basis for comparison to other objects in the image 401. To examine the shape, the selection 407a, encompassing the object 405a, is reduced to its component edges (also referred to as an "edge map") by combining multiple points in the selection 407a using Bézier curve equations. In some implementations, the edge map is instead produced from the selection 407a using a Canny edge detector or similar edge detection algorithm. In FIG. 5, an exemplary output of the edge detection algorithm is shown as the object edge map 501 that presents the edges of the object 405a.

The shape formed by the various edges of the object edge map 501 are then described using a feature description algorithm, where the description is stored as a set of feature descriptors ("object feature descriptors") that, for each feature, includes a vector describing the feature, as well as a position of the feature in the image 401. It should be noted that although the dimensions of the edge map 501 may follow the shape of the selection 407a, the object feature descriptors describe the shape formed by the edges present within the selection 407a without regard to the shape of the selection itself. Various feature description algorithms are available and can be used, such as Scale-Invariant Feature Transform (SIFT), Oriented FAST and Rotated BRIEF (ORB), or other possible algorithms. These and other edge detection and feature description algorithms are available, for example, in the Open Source Computer Vision (OpenCV) library that is maintained by OpenCV.org and available at http://opencv.org/.

Figure 6:

In addition to determining the object feature descriptors representing the object 405a in the object edge map 501, the image manipulation engine 321 determines feature descriptors for all edges that are automatically detected in the image 401. Although the following description refers to processing the entirety of the image 401, in some implementations, the feature descriptors are not determined for all edges in the entire image 401, but rather only in the portion of the image 401 that is external to the object 405a in the selection 407a. To that end, an edge map is made for the image 401 using a Canny edge detector or similar edge detection algorithm. In various implementations, adaptive hysteresis localization and thresholding is also used in order to reduce noise in the image 401, thereby reducing the likelihood of creating false edges. An exemplary output of the edge detection algorithm is shown in FIG. 6 as the image edge map 601 that presents the edges of the of the image 401.

The shapes formed by the various edges of the image edge map 601 are then described using a feature description algorithm, where the description is stored as a set of feature descriptors ("image feature descriptors") that, for each feature, includes a vector describing the feature, as well as a position of the feature in the image 401. Various feature description algorithms are available and can be used, such as SIFT, ORB, or other possible algorithms.

Subsequently, the image manipulation engine 321 searches for the presence of other objects whose shapes are within a "similarity threshold" to the shape of the object 405a within the image 401 by first comparing the feature descriptors for the object edge map 501 with the feature descriptors for the image edge map 601. The feature descriptor comparison can be carried out using a classification algorithm, such as the k-Nearest Neighbors (k-NN) algorithm, whereby each feature descriptor from the set of object feature descriptors is compared to each of the image feature descriptors. In particular, k-NN attempts to find a feature descriptor from the image feature descriptors which has the same vector as a feature descriptor from the object feature descriptors and is as close as possible to the position (i.e., pixel coordinates) of the feature in the object 405a. For the k-NN algorithm, various k-NN classifier values (i.e., the number of neighbors considered) can be used, though experimental results show that k-NN classifier values of 2 or greater produce desirable results. Once the iteration of the k-NN algorithm is complete, the ones (if any) of the image feature descriptors that match the object feature descriptors are found, as well as the distance between these matching features in the image 401.

In addition, to the above steps of searching for object feature descriptors present within the image feature descriptors, the image manipulation engine 321 also searches for image feature descriptors having the same vector as the object feature descriptors (also referred to as a "bi-directional classification"). As discussed above, the k-NN algorithm can be used to perform the search, whereby each feature descriptor from the image feature descriptors is compared to the object feature descriptors. Once this iteration of the k-NN algorithm is complete, any object feature descriptors that match the image feature descriptors are found, as well as the distance between these matching features in the image 401. Thereafter, the image manipulation engine 321 identifies those pairs of features descriptors that were identified as matching in both iterations of the k-NN algorithm. For example, the pair of feature descriptors $I_i$ and $O_i$ for the image 401 and the object 405a, respectively, would be included only if they were identified as matching in both iterations of the k-NN algorithm.

The image manipulation engine 321 then performs a ratio test to further validate that the matching image feature descriptors identified correspond to similarly shaped objects in the image 401. For example, image feature descriptors $I_1$, $I_2$, and $I_3$ may have been identified as a match with object feature descriptors $O_1$, $O_2$, and $O_3$, respectively. The ratio test then validates that the ratio of the distance between pairs of positions (i.e., pixel coordinates) of $(I_1, I_2)$, $(I_2, I_3)$, $(I_3, I_1)$ is within a similarity threshold of the ratio of the distance between the corresponding pairs positions of $(O_1, O_2)$, $(O_2, O_3)$, $(O_3, O_1)$. That is, if a collection of features of a selected object truly corresponds to a collection of features of another object in an image, then the ratio of the distances between those features on the respective objects should also be similar. As a result, the ratio test further improves the accuracy of identified feature descriptor matches by verifying that the matching features from the image edge map 601 are arranged similarly to the corresponding features of the object 405a from the object edge map 501. The feature descriptors successfully validated by the ratio test thus coalesce to form groups of feature descriptors describing the shapes and pixel coordinates of other objects in the image edge map 601 that are similarly shaped as the object 405a. These objects within the image edge map 601 may be referred to herein as "edge objects."

Figure 7:
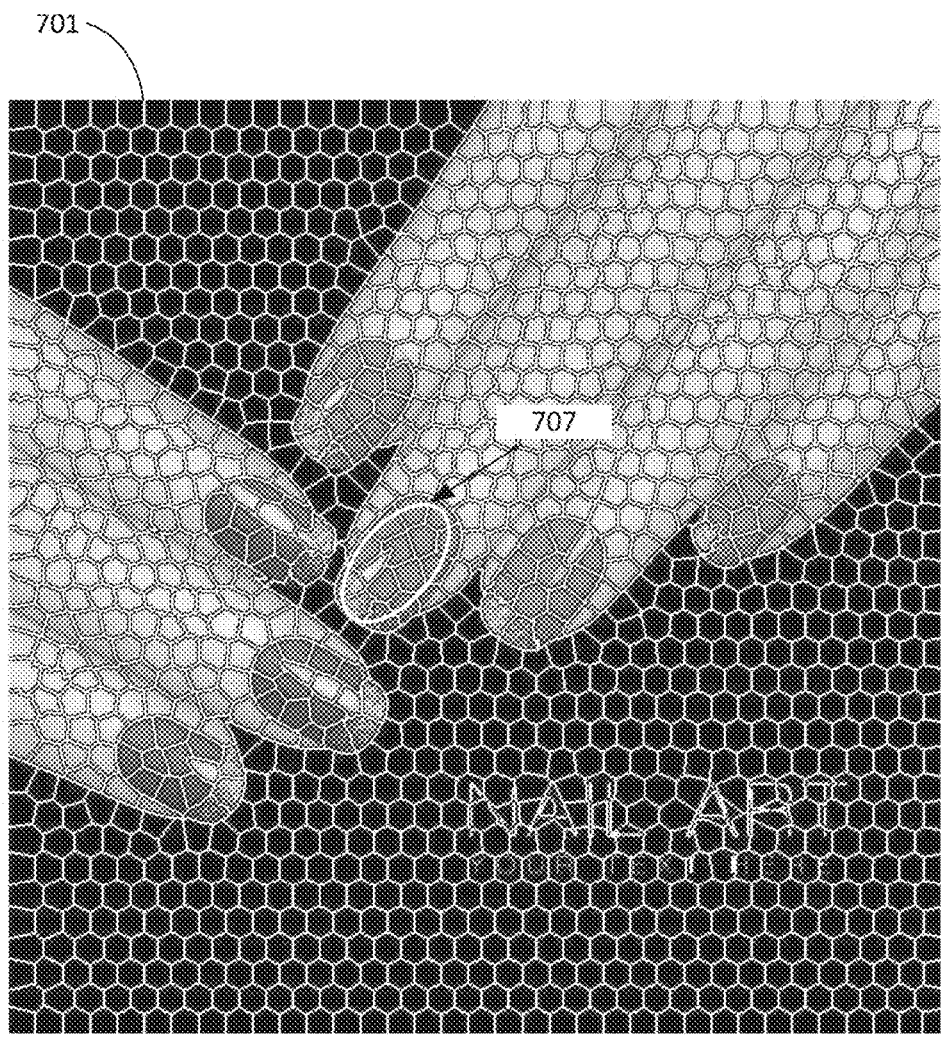

In order to translate the similarly shaped "edge objects" identified in the image edge map 601 to selected portions of the corresponding objects 405b-g in the image 401, the image manipulation engine 321 first divides a representation of the image 401 into superpixel regions, such as shown in the superpixel image 701 of FIG. 7. Within each superpixel region, the color of each pixel (sometimes referred to as the "pixel intensity") is identical or at least within a differential threshold with respect to each other pixel in the superpixel region. The superpixel image 701 can be created be choosing randomly distributed "seed" pixels from the image 401. From the seed pixels, adjacent pixels can be selected. If the adjacent pixel is the same color (or within the differential threshold), it is added to the superpixel region of the seed pixel, while if the color is different (or exceeds the differential threshold), the adjacent pixel starts a separate superpixel region.

Figure 8:
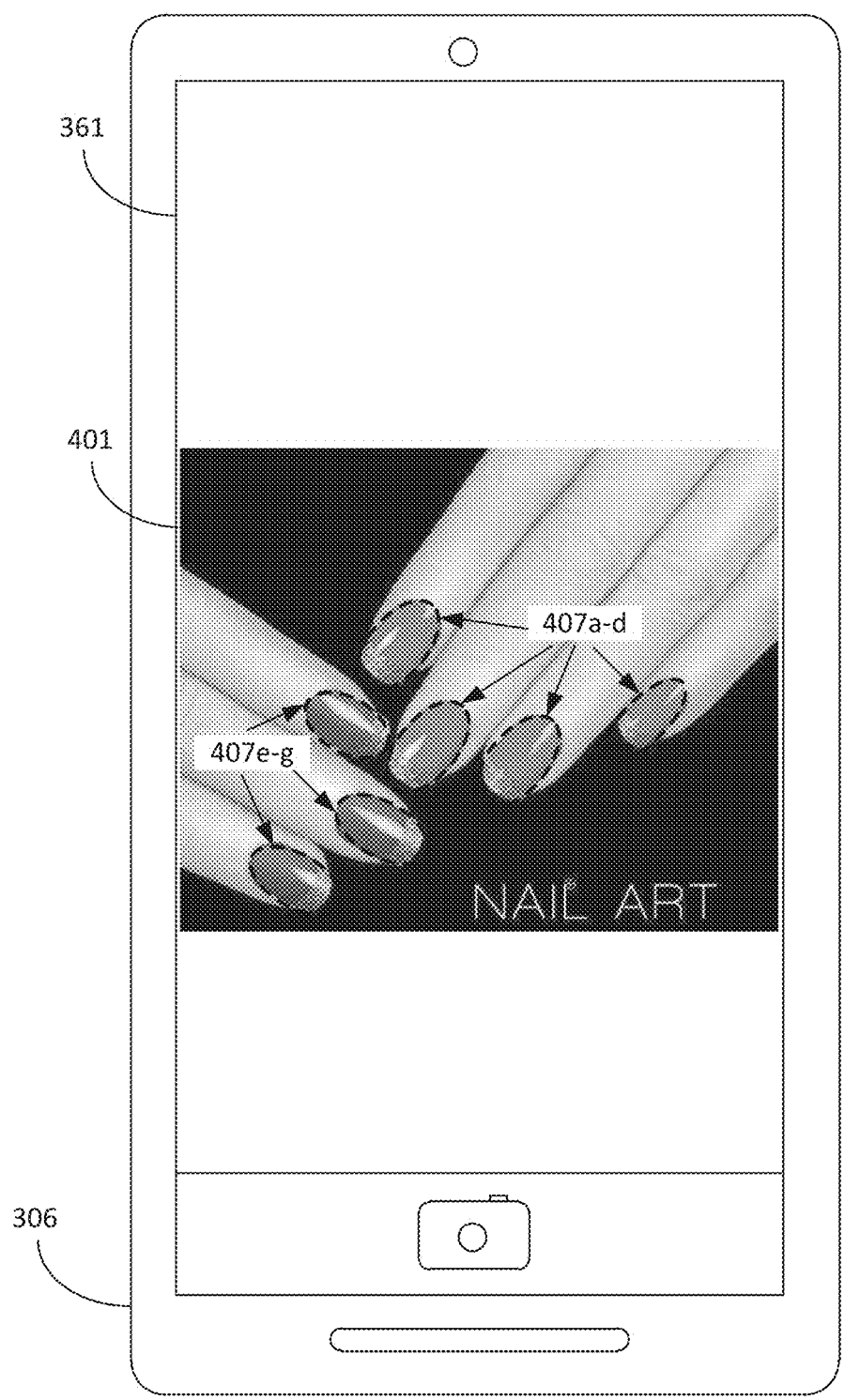
FIG. 8 is a diagram of another example user interface rendered by a computing device according to various embodiments of the present disclosure.

Subsequently, the image manipulation engine 321 identifies the groupings of superpixel regions that include the pixel coordinates of the previously identified edge objects, such as the exemplary region 707 defined by the pixel coordinates of one of an edge object. The perimeter of each group of superpixel regions defines coordinates for a selection 407a-g of a corresponding object 405a-g in the image 401, as shown in FIG. 8. In some implementations, the image manipulation engine 321 resolves inconsistencies between the shape of the perimeter of a group of superpixel regions and the shape of the object 405a image by first determining a set of feature descriptors for the edges of the superpixel regions ("superpixel feature descriptors") of the superpixel image 701 (FIG. 7). In these implementations, the superpixel regions included in each grouping of superpixel regions is adjusted until the superpixel feature descriptors and the object feature descriptors confirm that the shape formed by the perimeter of the groupings of superpixel regions corresponds to the shape of the object 405a. In other implementations, the user interface 365 allows a user to provide input to de-select and/or adjust the selections 407a-g.

Thereafter, the image manipulation engine 321 modifies the pixels of the selected objects 405a-g (FIG. 4) according to a specified function. For example, the function may adjust the color or texture of the objects 405a-g, "cut" the objects 405a-g from the image 401, and/or perform other possible functions as can be appreciated.

Figure 9:
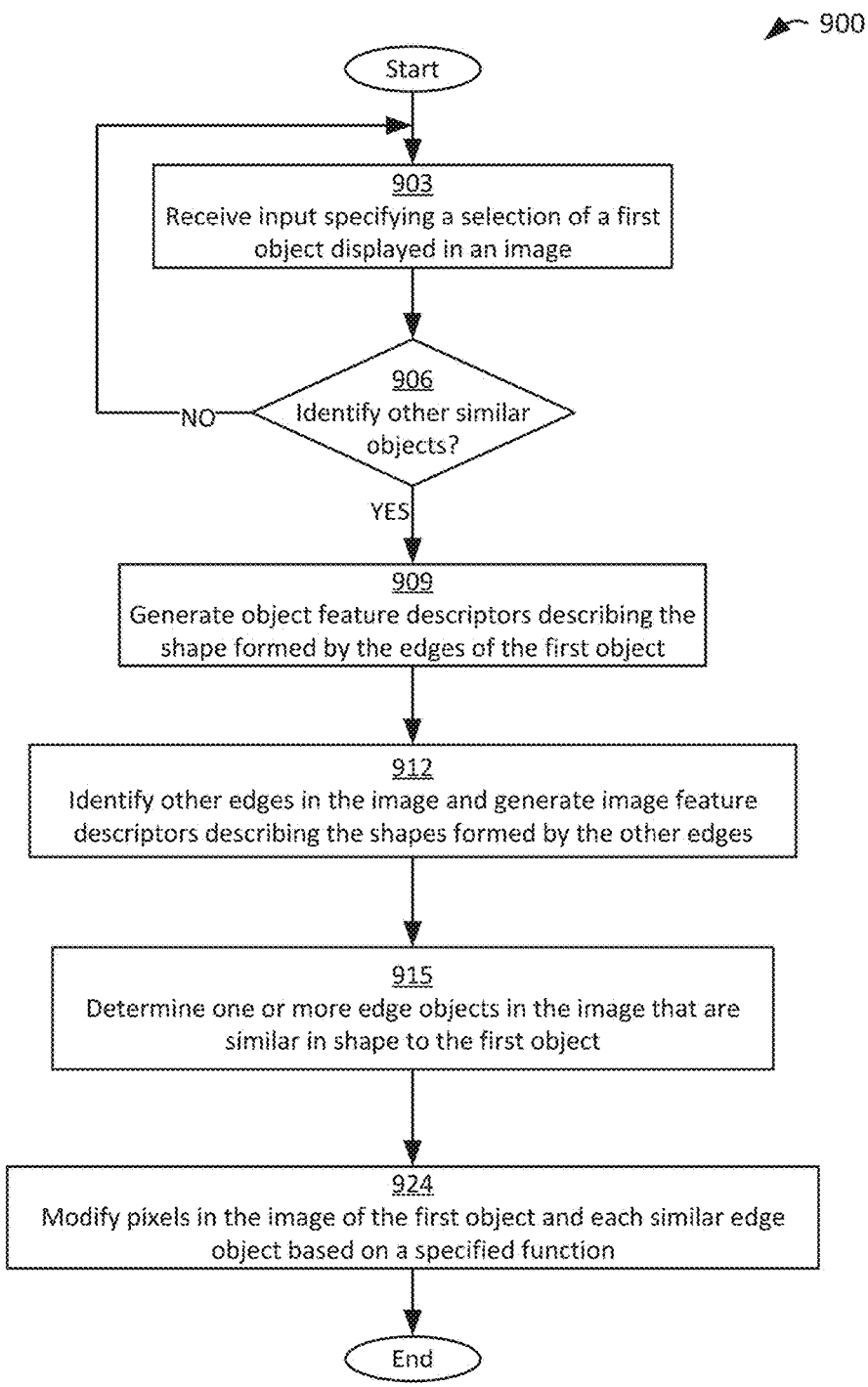
FIG. 9 is a flowchart illustrating one example of functionality implemented as portions of a method executed in a computing device according to various embodiments of the present disclosure.

Referring next to FIG. 9, shown is a flowchart that provides one example of the operation of a portion of the image manipulation engine 321 according to various embodiments. It is understood that the flowchart of FIG. 9 provides merely an example of the many different types of functional arrangements that may be employed to implement the operation of the portion of the image manipulation engine 321 as described herein. As an alternative, the flowchart of FIG. 9 may be viewed as depicting an example of elements of a method 900 implemented in the computing environment 303 (FIG. 3) according to one or more embodiments. This portion of the method 900 may be implemented in response to a user opening and displaying an image on a computing device through use of the image manipulation engine 321.

Beginning with block 903, the image manipulation engine 321 receives input specifying a selection of a first object displayed in an image. For example, a user could use a mouse, a touch-sensitive display, or some other input device of a computing device to draw or otherwise define a selection around the first object in the image displayed on a display device. Then, in block 906, the image manipulation engine 321 determines whether other similar objects should be identified. The user can direct the computing device to automatically select other objects in the image that are similarly shaped to the previously selected object by providing input to a user interface or by providing other possible input. In some implementations, the user can specify, via the user interface, that additional images accessible by the computing device should also be examined as part of the procedure to identify and select objects similar to the selected object. If the user chooses not to automatically identify other similar objects, execution of the image manipulation engine 321 returns to block 903.

Alternatively, if the user chooses to automatically identify other similar objects, in block 909, the image manipulation engine 321 begins the procedures to generate a first set of feature descriptors describing the shape formed by edges of the first object ("object feature descriptors"). In some implementations, the procedures include reducing the selection made by the user, including the object, to its component edges or "edge map" by using a Canny edge detector algorithm, by combining multiple points in the selection using Bezier curve equations, or by using another edge detection algorithm. The various edges of the edge map for the first object ("object edge map") are then described using a feature description algorithm, where the description is stored as a set of feature descriptors that, for each feature, includes a vector describing the feature, as well as a position of the feature in the image. Various feature description algorithms are available and can be used, such as SIFT, ORB, or other possible algorithms.

Next, in block 912, the image manipulation engine 321 begins the procedures to generate a second set of feature descriptors describing shapes formed by the other edges detected in the image ("image feature descriptors"). Although the following description refers to processing the entirety of the image, in some implementations, the feature descriptors are not determined for all edges in the entire image, but rather only in the portion of the image that is external to the first object in the selection. To that end, an edge map is made for the image using a Canny edge detector or similar edge detection algorithm. In various implementations, adaptive hysteresis localization and thresholding is also used in order to reduce noise in the image, thereby reducing the likelihood of creating false edges. The shapes formed by the various edges of the edge map for the image ("image edge map") are then described using a feature description algorithm, where the description is stored as the image feature descriptors that, for each feature, includes a vector describing the feature, as well as a position of the feature in the image.

Then, in block 915, the image manipulation engine 321 determines one or more edge objects in the image edge map that are within a similarity threshold to the shape of the object described by the object feature descriptors. To that end, in some implementations the image manipulation engine 321 first compares the object feature descriptors and the image feature descriptors. The feature descriptor comparison can be carried out using a classification algorithm, such as the k-NN algorithm, whereby each feature descriptor from the set of object feature descriptors is compared to the image feature descriptors. In particular, k-NN attempts to find a feature descriptor from the image feature descriptors which has the same vector as a feature descriptor from the object feature descriptors and is as close as possible to the position (i.e., pixel coordinates) of the feature in the first object. Once the iteration of the k-NN algorithm is complete, the ones (if any) of the image feature descriptors that match the object feature descriptors are found, as well as the distance between these matching features in the image.

In addition, to the above steps of searching for object feature descriptors present within the image feature descriptors, the image manipulation engine 321 also searches for image feature descriptors present within the object feature descriptors (also referred to as a "bi-directional classification"). As discussed above, the k-NN algorithm can be used to perform the search, whereby each feature descriptor from the image feature descriptors is compared to the object feature descriptors. Once this iteration of the k-NN algorithm is complete, the object feature descriptors that match the image feature descriptors are found, as well as the distance between these matching features in the image. Thereafter, the image manipulation engine 321 identifies those pairs of features descriptors that were identified as matching in both iterations of the k-NN algorithm.

The image manipulation engine 321 then performs a ratio test to further validate that the matching image feature descriptors identified correspond to similarly shaped objects in the image. For example, image feature descriptors $I_1$, $I_2$, and $I_3$ may have been identified as a match with object feature descriptors $O_1$, $O_2$, and $O_3$, respectively. The ratio test then validates that the ratio of the distance between pairs of positions (i.e., pixel coordinates) of $(I_1, I_2)$, $(I_2, I_3)$, $(I_3, I_1)$ is within a similarity threshold of the ratio of the distance between the corresponding pairs positions of $(O_1, O_2)$, $(O_2, O_3)$, $(O_3, O_1)$. That is, if a collection of features of the first object truly corresponds to a collection of other features from another object, then the ratio of the distances between those features on the respective objects should also be similar. As a result, the ratio test further improves the accuracy of identified feature descriptor matches by verifying that the matching features from the image edge map are arranged similarly to the corresponding features of the first object from the object edge map. The feature descriptors successfully validated by the ratio test thus coalesce to form groups of feature descriptors describing the shapes and pixel coordinates of other objects in the image edge map that are similarly shaped as the first object. These objects within the image edge map 601 may be referred to herein as "edge objects."

Next, in block 924, the image manipulation engine 321 modifies the pixels in the image of the first object and each similar edge object according to a specified function. For example, the function may adjust the color or texture of the objects, "cut" the objects from the image, and/or perform other possible functions as can be appreciated. In some implementations, the image manipulation engine 321 refines the accuracy of the objects identified within the image prior to modifying pixels by identifying a grouping of superpixel regions for each edge object, where the grouping includes the pixels of the respective edge object. In order to translate the similarly shaped "edge objects" identified in the image edge map to selected portions of the corresponding objects in the image, the image manipulation engine 321 first divides a representation of the image into superpixel regions referred to as a superpixel image. Within each superpixel region, the color of each pixel (sometimes referred to as the "pixel intensity") is identical or at least within a differential threshold with respect to each other pixel in the superpixel region. The superpixel image can be created be choosing randomly distributed "seed" pixels from the image. From the seed pixels, adjacent pixels can be selected. If the adjacent pixel is the same color (or within the differential threshold), it is added to the superpixel region of the seed pixel, while if the color is different (or exceed the differential threshold), the adjacent pixel starts a separate superpixel region. Subsequently, the image manipulation engine 321 identifies the groupings of superpixel regions that include the pixel coordinates of the previously identified edge objects. The coordinates for an object in the image are defined by the perimeter of a corresponding group of superpixel regions. The coordinates may be used by the image manipulation engine 321 to more accurately identify the pixels to be modified in step 924 and/or may be used to define a selection for each edge object that may be adjusted by a user prior to the modification of step 924.

In various implementations, the image manipulation engine 321 can resolve inconsistencies between the shape of the perimeter of a group of superpixel regions and the shape of the first object by first determining a set of feature descriptors for the edges of the superpixel regions ("superpixel feature descriptors") of the superpixel image. The superpixel regions included in each grouping of superpixel regions is adjusted until the superpixel feature descriptors and the object feature descriptors confirm that the shape formed by the perimeter of the groupings of superpixel regions corresponds to the shape of the first object. Thereafter, this portion of the image manipulation engine 321 ends as shown.

Figure 10:
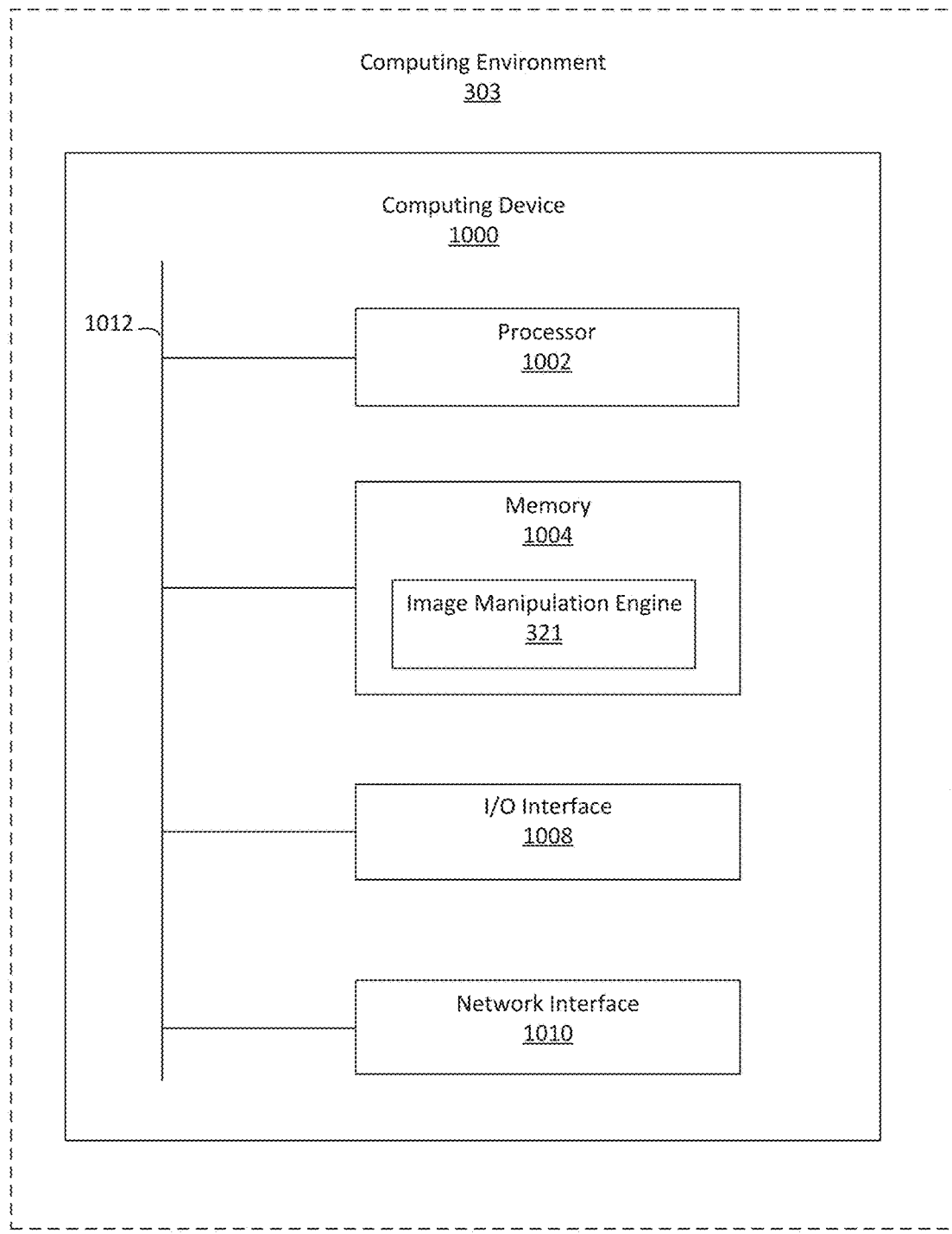
FIG. 10 is a schematic block diagram that provides one example illustration of a computing environment employed in the networked environment of FIG. 3 according to various embodiments of the present disclosure.

With reference to FIG. 10, shown is a schematic block diagram of the computing environment 303 according to an embodiment of the present disclosure. The computing environment 303 includes one or more computing devices 1000. Each computing device 1000 includes at least one processor circuit, for example, having a processor 1002, a memory 1004, an I/O interface 1008, and a network interface 1010, all of which are coupled to a local interface 1012. To this end, each computing device 1000 may comprise, for example, at least one server computer or like device. The I/O interface 1008 can interface with various devices, both locally attached and remote, for receiving and transmitting data, such as displays (including touch-sensitive displays), cameras, microphones, keyboards, mice, etc. The local interface 1012 may comprise, for example, a data bus with an accompanying address/control bus or other bus structure as can be appreciated.

Stored in the memory 1004 are both data and several components that are executable by the processor 1002. In particular, stored in the memory 1004 and executable by the processor 1002 is the image manipulation engine 321, and potentially other applications. Also stored in the memory 1004 may be a data store and other data. In addition, an operating system may be stored in the memory 1004 and executable by the processor 1002.

It is understood that there may be other applications that are stored in the memory 1004 and are executable by the processor 1002 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1004 and are executable by the processor 1002. In this respect, the term "executable" means a program file that is in a form that can ultimately be run by the processor 1002. Examples of executable programs may be, for example, a compiled program that can be translated into machine code in a format that can be loaded into a random access portion of the memory 1004 and run by the processor 1002, source code that may be expressed in proper format such as object code that is capable of being loaded into a random access portion of the memory 1004 and executed by the processor 1002, or source code that may be interpreted by another executable program to generate instructions in a random access portion of the memory 1004 to be executed by the processor 1002, etc. An executable program may be stored in any portion or component of the memory 1004 including, for example, random access memory (RAM), read-only memory (ROM), hard drive, solid-state drive, USB flash drive, memory card, optical disc such as compact disc (CD) or digital versatile disc (DVD), magnetic tape, or other memory components.

The memory 1004 is defined herein as including both volatile and nonvolatile memory and data storage components. Volatile components are those that do not retain data values upon loss of power. Nonvolatile components are those that retain data upon a loss of power. Thus, the memory 1004 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1002 may represent multiple processors 1002 and/or multiple processor cores and the memory 1004 may represent multiple memories 1004 that operate in parallel processing circuits, respectively. In such a case, the local interface 1012 may be an appropriate network that facilitates communication between any two of the multiple processors 1002, between any processor 1002 and any of the memories 1004, or between any two of the memories 1004, etc. The local interface 1012 may comprise additional systems designed to coordinate this communication, including, for example, performing load balancing. The processor 1002 may be of electrical or of some other available construction.

Although the image manipulation engine 321 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 9 shows the functionality and operation of an implementation of portions of the method 900. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1002 in a computer system or other system. The machine code may be converted from the source code, etc. If embodied in hardware, each block may represent a circuit or a number of interconnected circuits to implement the specified logical function(s).

Although the flowchart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. Further, in some embodiments, one or more of the blocks shown in FIG. 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the image manipulation engine 321, that comprises software or code can be embodied in any non-transitory computer-readable medium for use by or in connection with an instruction execution system such as, for example, a processor 1002 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the image manipulation engine 321, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1000, or in multiple computing devices in the same computing environment 303. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method for automatically selecting similar objects for modification within images stored in a computing device, comprising:
receiving, by a processor of the computing device, input via an input device of the computing device specifying a first selection of a first object in an image displayed on a user interface of the computing device;
generating, by the processor, a first set of feature descriptors that describe a shape formed by edges of the first object;
identifying, by the processor, a plurality of other edges in a remaining portion of the image excluding the first object and generating a second set of feature descriptors describing shapes formed by the other edges;
determining, by the processor, one or more edge objects in the image that are similar in shape to the first object by identifying each grouping of the other edges that has feature descriptors of the second set of feature descriptors that describe a shape that is within a similarity threshold to the shape described by the first set of feature descriptors;
updating the user interface to include visual selection indicators applied to the first object and each similar edge object; and
modifying, by the processor, pixels in the image of the first object and each similar edge object based on a function specified by a user, wherein said modifying based on the function is separate from updating the user interface to include visual selection indicators.

2. The method of claim 1, further comprising:
dividing the image into superpixel regions, wherein pixels within each superpixel region have the same pixel intensity;
identifying a grouping of superpixel regions of the image for each edge object, wherein each grouping of superpixel regions includes the pixels of the respective edge object; and
determining a selection for each similar edge object by selecting a region of the image corresponding to a perimeter of each grouping of superpixel regions.

3. The method of claim 2, further comprising generating a third set of feature descriptors based on the superpixel regions of the image, the third set of feature descriptors describing shapes formed by edges of the superpixel regions in the image,
wherein each grouping of superpixel regions is determined based on comparing the third set of feature descriptors for the superpixel regions with the first set of feature descriptors that describe the shape formed by the edges of the first object selected in the image.

4. The method of claim 1, wherein the first set of feature descriptors and the second set of feature descriptors are generated using an Oriented FAST and Rotated BRIEF (ORB) algorithm, the feature descriptors being invariant to uniform scaling and orientation.

5. The method of claim 1, further comprising:
generating a first edge map for the first selection of the first object in the image, the first set of feature descriptors generated from the first edge map; and
generating a second edge map for the image based on the remaining portion of the image that excludes the first object, the second set of feature descriptors generated from the second edge map.

6. The method of claim 5, wherein the first edge map and the second edge map are generated using a Canny edge detector algorithm.

7. The method of claim 1, wherein the image is one of a plurality of images in which the computing device identifies other edge objects having similar shapes as the first object.

8. A non-transitory computer-readable medium embodying a program for automatically selecting similar objects for modification within images, the program executable by a processor in a computing device, comprising:
code that receives input via an input device of the computing device specifying a first selection of a first object in an image displayed on a user interface of the computing device;
code that generates a first set of feature descriptors that describe a shape formed by edges of the first object;
code that identifies a plurality of other edges in a remaining portion of the image excluding the first object of the image and generating a second set of feature descriptors describing shapes formed by the other edges;
code that determines one or more edge objects in the image that are similar in shape to the first object by identifying each grouping of the other edges that has feature descriptors of the second set of feature descriptors that describe a shape that is within a similarity threshold to the shape described by the first set of feature descriptors; and code that modifies pixels in the image of the first object and each similar edge object based on a function specified by a user.

9. The non-transitory computer-readable medium of claim 8, wherein the first set of feature descriptors and the second set of feature descriptors are generated using an Oriented FAST and Rotated BRIEF (ORB) algorithm, the feature descriptors being invariant to uniform scaling and orientation.

10. The non-transitory computer-readable medium of claim 8, wherein the program further comprises:
code that divides the image into superpixel regions, wherein pixels within each superpixel region have the same pixel intensity;
code that identifies a grouping of superpixel regions of the image for each edge object, wherein each grouping of superpixel regions includes the pixels of the respective edge object; and
code that determines a selection for each similar edge object by selecting a region of the image corresponding to a perimeter of each grouping of superpixel regions.

11. The non-transitory computer-readable medium of claim 8, wherein the program further comprises:
code that generates a first edge map for the first selection of the first object in the image, the first set of feature descriptors generated from the first edge map; and
code that generates a second edge map for the image based on the remaining portion of the image that excludes the first object, the second set of feature descriptors generated from the second edge map.

12. The non-transitory computer-readable medium of claim 11, wherein the first edge map and the second edge map are generated using a Canny edge detector algorithm.

13. The non-transitory computer-readable medium of claim 8, wherein the image is one of a plurality of images in which the computing device identifies other edge objects having similar shapes as the first object.

14. A computing device, comprising:
an input device accessible to the computing device via an I/O interface;
a memory for storing an application, wherein the application comprises computer-implemented instructions for automatically selecting similar objects for modification within images; and
a processor for executing the computer-implemented instructions of the application and thereby causing the computing device to perform operations comprising:
receiving input via the input device specifying a first selection of a first object in an image displayed on a user interface of the computing device;
generating a first set of feature descriptors that describe a shape formed by edges of the first object;
identifying a plurality of other edges in a remaining portion of the image excluding the first object and generating a second set of feature descriptors describing shapes formed by the other edges;
determining one or more edge objects in the image that are similar in shape to the first object by identifying each grouping of the other edges that has feature descriptors of the second set of feature descriptors that describe a shape that is within a similarity threshold to the shape described by the first set of feature descriptors; and
modifying pixels in the image of the first object and each similar edge object based on a function specified by a user.

15. The computing device of claim 14, the operations further comprising:
dividing the image into superpixel regions, wherein pixels within each superpixel region have the same pixel intensity;
identifying a grouping of superpixel regions of the image for each edge object, wherein each grouping of superpixel regions includes the pixels of the respective edge object; and
determining a selection for each similar edge object by selecting a region of the image corresponding to a perimeter of each grouping of superpixel regions.

16. The computing device of claim 15, the operations further comprising generating a third set of feature descriptors based on the superpixel regions of the image, the third set of feature descriptors describing shapes formed by edges of the superpixel regions in the image,
wherein the grouping of superpixel regions is determined based on comparing the third set of feature descriptors for the superpixel regions with the first set of feature descriptors that describe the shape formed by the edges of the first object selected in the image.

17. The computing device of claim 14, wherein the first set of feature descriptors and the second set of feature descriptors are generated using an Oriented FAST and Rotated BRIEF (ORB) algorithm, the feature descriptors being invariant to uniform scaling and orientation.

18. The computing device of claim 14, the operations further comprising:
generating a first edge map for the first selection of the first object in the image, the first set of feature descriptors generated from the first edge map; and
generating a second edge map for the image based on the remaining portion of the image that excludes the first object, the second set of feature descriptors generated from the second edge map.

19. The computing device of claim 18, wherein the first edge map and the second edge map are generated using a Canny edge detector algorithm.

20. The computing device of claim 14, wherein the image is one of a plurality of images in which the computing device identifies other edge objects having similar shapes as the first object.

* * * * *